(12) United States Patent
Ebrahimi et al.

(10) Patent No.: US 11,620,418 B2
(45) Date of Patent: Apr. 4, 2023

(54) EFFICIENT SENSITIVITY ANALYSIS FOR GENERATIVE PARAMETRIC DESIGN OF DYNAMIC MECHANICAL ASSEMBLIES

(71) Applicant: AUTODESK, INC., San Francisco, CA (US)

(72) Inventors: Mehran Ebrahimi, Toronto (CA); Adrian Butscher, Toronto (CA); Hyunmin Cheong, Toronto (CA); Francesco Iorio, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 404 days.

(21) Appl. No.: 15/924,138

(22) Filed: Mar. 16, 2018

(65) Prior Publication Data
US 2019/0286786 A1 Sep. 19, 2019

(51) Int. Cl.
*G06F 111/10* (2020.01)
*G06F 30/17* (2020.01)

(52) U.S. Cl.
CPC .......... *G06F 30/17* (2020.01); *G06F 2111/10* (2020.01)

(58) Field of Classification Search
CPC .......... G06F 30/00; G06F 30/20; G06F 30/17; G06F 30/23; G06F 2111/04; G06F 17/10
See application file for complete search history.

(56) References Cited

U.S. PATENT DOCUMENTS

| | | | | |
|---|---|---|---|---|
| 5,835,693 | A | * 11/1998 | Lynch | G06F 30/17 345/473 |
| 2002/0156604 | A1 | * 10/2002 | Rosenthal | G16B 35/00 703/2 |
| 2004/0210426 | A1 | * 10/2004 | Wood | G06F 30/20 703/2 |

(Continued)

OTHER PUBLICATIONS

Lauβ et al. The Discrete Adjoint Method for Parameter Identification in Multibody System Dynamics Multibody Syst Dyn, 42, 2018 pp. 397-410 (Year: 2017).*

(Continued)

*Primary Examiner* — Rehana Perveen
*Assistant Examiner* — Cuong V Luu
(74) *Attorney, Agent, or Firm* — Artegis Law Group, LLP

(57) ABSTRACT

A design engine generates a configuration option that includes a specific arrangement of interconnected mechanical elements adhering to one or more design constraints. Each element within a given configuration option is defined by a set of design variables. The design engine implements a parametric optimizer to optimize the set of design variables associated with each configuration option. For a given configuration option, the parametric optimizer discretizes continuous equations governing the physical dynamics of the configuration. The parametric optimizer then determines the gradient of an objective function based on the discretized equations the gradient of objective and constraint functions based on discrete direct differentiation method or discrete adjoint variable method derived directly from the discretized (Continued)

motion equations. Then, the parametric optimizer traverses a design space where the configuration option resides to reduce improve the objective function, thereby optimizing the design variables.

16 Claims, 4 Drawing Sheets

(56) References Cited

U.S. PATENT DOCUMENTS

| | | | | |
|---|---|---|---|---|
| 2009/0106005 A1* | 4/2009 | Kondo | ............... | G06F 30/20 703/7 |
| 2009/0228244 A1* | 9/2009 | Naudet | ............... | G06F 30/20 703/2 |
| 2012/0150499 A1* | 6/2012 | Todorov | ............... | G06F 30/20 703/2 |

OTHER PUBLICATIONS

LauB et al. The Discrete Adjoint Gradient Computation for Optimization Problem in Multibody Dynamics Journal of computational and Nonlinear Dynamics, vol. May 12, 2017 (Year: 2017).*
Oberpeilsteiner et al. Optimal Input Design for Multibody Systems by Using an Extended Adjoint Approach Multibody Syst Dyn, Sep. 2016 (Year: 2016).*
Nachbagauer et al. The Use of the Adjoint Method for Solving Typical Optimization Problems in Multibody Dynamics Journal of Computational and Nonlinear Dynamics, vol. 10/061011, pp. 1-10, Nov. 2015 (Year: 2015).*
Alfonso Goena Dynamic Response Optimization of Vehicles through Efficient Multibody Formations and Antomatic Differentiation Techniques Doctoral Thesis Universidad Politénica de Madrid, 2013 (Year: 2013).*
Beck et al., "Enforcing Connectivity in a Fixed Degree Graph: A Constraint Programming Case Study", URL: https://core.ac.uk/display/20738491, 2008, 15 pages.
Stern et al., "Discrete geometric mechanics for variational time integrators", SIGGRAPH '06: ACM SIGGRAPH 2006 Courses, Jul. 2006, pp. 75-80.
Leyendecker et al., "Variational integrators for constrained dynamical systems", Zeitschrift für Angewandte Mathematik und Mechanik, vol. 88, No. 9, Sep. 2008, pp. 677-708.
Kane et al., "Variational Integrators and the Newmark Algorithm for Conservative and Dissipative Mechanical Systems", International Journal for Numerical Methods in Engineering, vol. 49, No. 10, Oct. 2000, pp. 1295-1325.
Johnson et al., "Scalable variational integrators for constrained mechanical systems in generalized coordinates", URL: https://doi.org/10.1109/TRO.2009.2032955, IEEE Transactions on Robotics, vol. 25, No. 6, Dec. 2009, pp. 1249-1261.
Kharevych et al., "Geometric, Variational Integrators for Computer Animation", Computer animation 2006 : ACM SIGGRAPH / Eurographics Symposium Proceedings, Eurographics Association, Sep. 2006, pp. 43-51.
Krenk, S., "Energy conservation in Newmark based time integration algorithms", Computer Methods in Applied Mechanics and Engineering, vol. 195, Sep. 2006, pp. 6110-6124.
Betsch et al., "A comparison of DAE integrators in the context of benchmark problems for flexible multibody dynamics", Journal of Mechanical Science and Technology, vol. 29, No. 7, Jul. 2015, pp. 2653-2661.
Lens et al., "Energy preserving time integration for constrained multibody systems", Multibody System Dynamics, vol. 11, No. 1, Feb. 2004, pp. 41-61.
Negrut et al., "A discussion of low-order numerical integration formulas for rigid and flexible multibody dynamics", Journal of Computational and Nonlinear Dynamics, vol. 4, No. 2, Mar. 9, 2009, pp. 021008-1-021008-11.
Lens et al., "An Energy Preserving Scheme for Constrained Flexible Nonlinear Multibody Systems", Mecánica Computacional, vol. 23, Dec. 2004, pp. 545-562.
Farrell, K., "Hamiltonian Mechanics and the Construction of Numerical Integrators", URL: http://www.math.ucsd.edu/_files/undergraduate/honors-program/honors-program-presentations/2008-2009/Kathryn_Farrell_Honors_Thesis.pdf, Department of Mathematics, University of California, San Diego, Jun. 1, 2009, pp. 1-29.
Betsch et al., "Variational integrators and energy-momentum schemes for flexible multibody dynamics", Journal of Computational and Nonlinear Dynamics, vol. 5, No. 3, Jul. 2010, pp. 031001-1-031001-11.

* cited by examiner

EFFICIENT SENSITIVITY ANALYSIS FOR GENERATIVE PARAMETRIC DESIGN OF DYNAMIC MECHANICAL ASSEMBLIES

BACKGROUND

Field of the Various Embodiments

Embodiments of the present invention relate generally to computer-aided design and, more specifically, to efficient sensitivity analysis for generative parametric design of dynamic mechanical assemblies.

Description Of The Related Art

In the context of mechanical design and engineering, an "assembly" is a collection of mechanical parts that are coupled together in a manner that achieves a particular function to address a specific design problem. One example of an assembly is an automobile transmission that includes a collection of gears coupled together to provide torque conversions. The design problem addressed in this example is the need to transmit torque from the automobile crankshaft to the automobile wheels.

Designing a mechanical assembly is typically a manually-performed, multi-step process. Initially, a designer formulates the design problem to be solved using the mechanical assembly by determining a set of design objectives the assembly should meet. For example, when formulating the above-mentioned automobile transmission design problem, the designer could determine that the transmission should implement a specific conversion ratio in order to convert an input torque received from the automobile crankshaft to an output torque that is applied to the wheels of the automobile. In conjunction with determining the set of design objectives, the designer may further define the design problem by determining a set of design constraints that the assembly should not violate. For example, in the transmission design problem discussed above, the designer could determine that the mass of the transmission should not exceed a particular value. Design objectives and design constraints may be referred to collectively as "design criteria."

Once the designer determines the design criteria, the designer then selects mechanical parts to be included in the assembly. For example, the designer of the transmission could select a collection of gears to include in the transmission. Finally, the designer determines specific physical couplings between the selected parts in an effort to meet the design criteria. For example, the transmission designer could determine a specific arrangement of selected gears to implement the desired conversion between input and output torques.

Through design processes similar to the above-described process, designers are able to generate different designs for various mechanical assemblies. Once a particular design is created using such a design process, a designer may optimize some or all parts included in the design, typically via an optimization algorithm, to improve the design to better meet the design criteria. A conventional optimization algorithm operates via an iterative process that involves simulating the physical dynamics of the design and then evaluating the behavior of the design based on an objective function. The design can then be modified to better meet the design criteria. This process may be repeated until some convergence criterion is met. Conventional optimization algorithms for such applications suffer from at least two specific drawbacks.

First, conventional optimization algorithms oversimplify the definition of a given design in order to reduce complexity when evaluating the design. For example, a conventional optimization algorithm may convert a flexible structure to a rigid body or disregard the time-dependent behavior of the structure and consider only the critical or static loads when evaluating the design criteria. Because of these types of oversimplifications, conventional optimization algorithms cannot precisely approximate the dynamic behavior of designs, and, therefore, cannot accurately determine the degree to which design criteria are met. Consequently, convergence can be difficult to identify.

Second, a conventional optimization algorithm may not compute a gradient indicating whether design modifications improve the design because doing so is oftentimes computationally intractable. In particular, a typical mechanical assembly design has numerous interconnected parts governed by complex equations involving potentially numerous state variables. To compute a needed gradient, the derivative of these state variables with respect to design variables must first be determined, which is usually too complex to be performed within a reasonable time frame. Without computing a gradient when modifying the design, the design space associated with the design problem cannot be explored in an informed manner. Thus, finding optimal designs within that design space can be difficult or impossible.

As the foregoing illustrates, what is needed in the art are more effective techniques for optimizing designs for mechanical assemblies.

SUMMARY

Various embodiments include a computer-implemented method for generating design options for dynamic mechanical assemblies, the method comprising: generating a first configuration for a mechanical assembly, wherein the first configuration includes a set of design variables associated with a plurality of interconnected elements, generating a first discretized equation based on at least one continuous equation of motion, wherein the first discretized equation indicates time-varying dynamics of the first configuration across a sequence of time steps, generating a second discretized equation based on the first discretized equation and a first objective function, and computing a modified set of design variables based on the second discretized equation and the set of design variables to generate a second configuration for the mechanical assembly, wherein the modified set of design variables minimizes the first objective function.

At least one advantage of this technique is that configuration options are not oversimplified in order to evaluate the objective function. Accordingly, the degree to which a given configuration option meets the design criteria can be more accurately determined compared to conventional techniques and convergence can therefore be more precisely identified. In addition, because the parametric optimizer computes the gradient of the objective function, the design space associated with the design problem can be explored in a more directed manner compared to conventional techniques that do not compute gradients. Finally, implementing discretized equations in the manner described produces more computationally stable results that are easier to solve compared to corresponding continuous equations.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
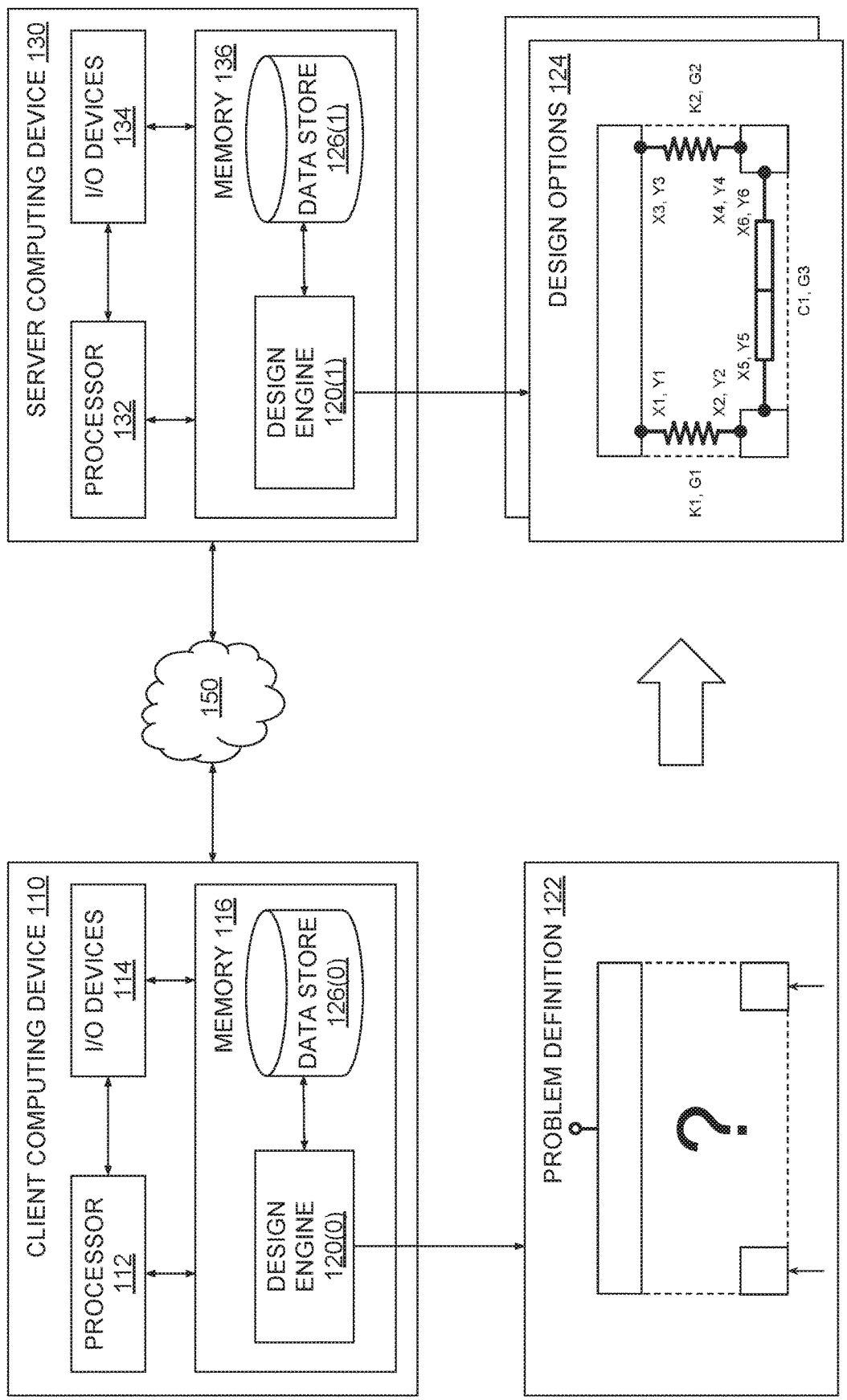
FIG. 1 illustrates a system configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

As noted above, conventional optimization strategies oversimplify the definition of mechanical assembly designs in order to reduce the complexity associated with evaluating time-dependent objective and constraint functions. Such algorithms cannot accurately capture the dynamic behavior of designs, and, thus, cannot precisely determine the degree to which design criteria are met. In addition, due to the high computational costs associated with analyzing sensitivity in dynamic mechanical systems, a conventional optimization algorithm may not compute a gradient indicating whether design modifications improve the design, and therefore cannot efficiently explore the design space to generate optimal designs.

To address these issues, embodiments of the invention include a design engine configured to generate design options that address a mechanical assembly design problem. Initially, the design engine generates a set of configuration options. A given configuration option includes a specific arrangement of interconnected mechanical elements adhering to one or more design constraints. Each element within a given configuration option is defined by a set of design variables. The design variables may include geometric parameters such as linear dimension, cross section, and so forth. The design variables may also include physical parameters, such as spring constant and damping constant, among others, positional parameters, such as joint location and orientation, and material parameters such as Young's modulus, density, and so forth.

The design engine then implements a parametric optimizer to simulate and optimize the configuration option. For a given configuration option, the parametric optimizer first discretizes and then solves a system of continuous equations that governs the physical dynamics of the configuration. In doing so, the parametric optimizer may implement a numerical time stepping technique, such as geometric variational integrators or, alternatively, any other solver that simulates the time evolution of a constrained multibody system. The parametric optimizer then performs a sensitivity analysis based on those discretized equations. The parametric optimizer computes the derivative of the discretized equations with respect to the set of design variables. Depending on the complexity of the configuration option (and dimensionality of the design space), the parametric optimizer may solve the set of discrete equations derived by directly differentiating the discretized equations of motion or solve a set of discrete adjoint equations when computing this derivative. Based on this derivative, the parametric optimizer determines a gradient associated with an objective function set forth in the problem definition. Then, based on this gradient, the parametric optimizer updates the configuration option to reduce the objective function. The parametric optimizer may repeat this process until the objective function is minimized or another convergence criterion is met. The parametric optimizer may also perform the above process using constraint equations, as well.

One advantage of this technique is that configuration options are not oversimplified in order to evaluate the objective function. Accordingly, the degree to which a given configuration option meets the design criteria can be more accurately determined compared to conventional techniques. In addition, because the parametric optimizer performs the computation of the required derivatives more efficiently compared to conventional methods, the designs space associated with the design problem can be explored in a more directed manner compared to conventional techniques that do not compute gradients. For at least these reasons, the disclosed approach represents a technical advancement over conventional optimization algorithms that are less accurate and less efficient.

System Overview

FIG. 1 illustrates a system configured to implement one or more aspects of the present embodiments. As shown, a system 100 includes a client computing device 110 coupled to a server computing device 130 via a network 150.

Client computing device 110 includes a processor 112, input/output (I/O) devices 114, and a memory 116, coupled together. Processor 112 includes any technically feasible set of hardware units configured to process data and execute software applications. For example, processor 112 could include one or more of a central processing unit (CPU), a graphics processing unit (GPU), and an application specific integrated circuit (ASICs). I/O devices 114 include any technically feasible set of devices configured to perform input and/or output operations, including, for example, a display device, a keyboard, a mouse, and a touchscreen, among others. Memory 116 includes any technically feasible set of storage media configured to store data and software applications, such as a hard disk, a random-access memory (RAM) module, and a read-only memory (ROM), for example. Memory 116 includes a design engine 120(0) and a data store 126(0).

Design engine 120(0) is a software application that, when executed by processor 112, generates problem definition 122. Problem definition 122 is a data structure that formally describes a design problem to be addressed via generation of a mechanical assembly. Problem definition 122 may indicate specific components that should be included in designs of the mechanical assembly, any physical relationships between those components, a set of objectives that should be met by mechanical assembly designs, and a set of constraints that should not be violated by those designs, among other things. Problem definition 122 may define the objectives and constraints as objective functions and constraint functions, respectively, to be optimized via an optimization process. Upon generating problem definition 122, design engine 120(0) transmits problem definition 122 to server computing device 130.

Server computing device 130 includes a processor 132, I/O devices 134, and memory 136, coupled together. Processor 132 includes any technically feasible set of hardware units configured to process data and execute software applications. I/O devices 134 include any technically feasible set of devices configured to perform input and/or output operations. Memory 136 includes any technically feasible set of storage media configured to store data and software applications. Memory 136 includes a design engine 120(1) and a data store 126(1).

Design engine 120(1) is a software application that, when executed by processor 132, generates one or more design options 124 based on problem definition 122. Each design option 124 represents a design of a mechanical assembly that addresses the design problem associated with problem definition 122. More specifically, a given design option 124 indicates a collection of components defined by a set of design variables. Those design variables may include geometric parameters, physical parameters, positional parameters, material parameters, and any other technically feasible set of quantities describing physical attributes. Exemplary positional parameters are shown as X1, Y1, X2, Y2, and so forth. Exemplary geometrical parameters are shown as G1, G2, G3, and so forth. Exemplary physical parameters include spring constant K1 and damping constant C1. The generation of design options 124 is described in greater detail below in conjunction with FIGS. 2-4.

In operation, design engine 120(0) and design engine 120(0) cooperate to implement any and all of the inventive functionality described herein, and therefore may be considered to represent different portions of single distributed software entity. Thus, for simplicity, design engines 120(0) and 120(1) are referred to hereinafter collectively as design engine 120. Similarly, data stores 126(0) and 126(1) represent different portions of a single distributed storage entity. Therefore, for simplicity, data stores 126(0) and 126(1) may be referred to collectively as data store 126. Design engine 120 implements various software modules in order to generate problem definition 122 and, ultimately, design options 124. Those software modules are discussed in greater detail below in conjunction with FIG. 2.

Figure 2:
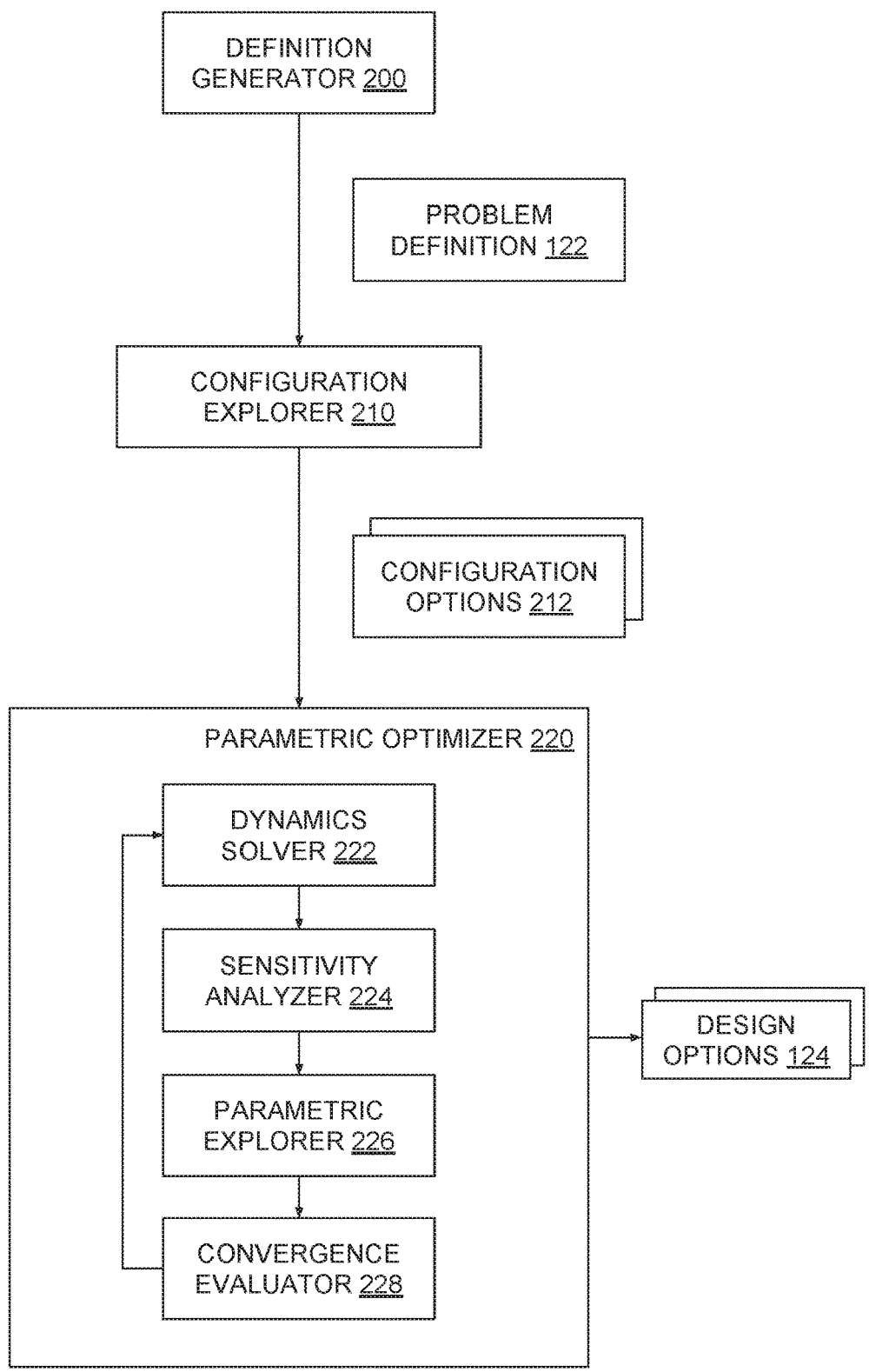
FIG. 2 is a more detailed illustration of the design engine of FIG. 1, according to various embodiments.

FIG. 2 is a more detailed illustration of the design engine of FIG. 1, according to various embodiments. As shown, design engine 120 includes a definition generator 200, a configuration explorer 210, and a parametric optimizer 220.

Definition generator 200 is a software module configured to generate problem definition 122 based on data captured from the end-user. Problem definition 122 includes a set of design constraints. Some design constraints may restrict how elements can be coupled together to form a configuration of a mechanical assembly. These design constraints may also be formulated as constraint functions. Problem definition 122 also includes a set of design objectives that define particular static and dynamic characteristics any mechanical assembly configuration should have in order to address the design problem. Similar to the design constraints, these design objectives may also be formulated as objective functions. Definition generator 200 transmits problem definition 122 to configuration explorer 200.

Configuration explorer 210 is a software module configured to implement a constraint programming approach to generate configuration options 212 for mechanical assemblies. In the context of this disclosure, a "configuration option" generally includes a discrete set of mechanical elements coupled together in a physically defined manner. Each element is generally associated with one or more design variables. A configuration option need not specify exact values for those design variables, though. For example, a given configuration option could describe a particular arrangement of springs, yet not specify the spring constant of each such spring. In practice, default values for the various design variables may be assigned in order to initiate an optimization process.

In one embodiment, configuration explorer 210 includes a configuration iterator and a constraint enforcer (none shown). These submodules interoperate to generate and test different configuration options iteratively using a constraint programming approach. According to this approach, configuration iterator generates potential configurations, and constraint enforcer then determines whether any of those configurations violate any design constraints set forth in problem definition. If a given configuration violates any design constraints, then configuration iterator may perform a backtracking process and abandon that configuration, as is known to those familiar with constraint programming. In this manner, configuration explorer 210 may perform an iterative process to explore some or all of a configuration design space associated with the design problem, thereby generating potentially numerous configuration options 216. Each such configuration option 216 may be considered "feasible" in the sense that a given configuration option 216 does not violate any design constraints.

Parametric optimizer 220 is a software module configured to optimize the design variables associated with each configuration option 212 previously generated via the above configuration iteration process. In doing so, parametric optimizer 220 iteratively assigns and/or updates specific values for those variables to minimize (or maximize) an objective function defined via problem definition 122. Returning to the spring example mentioned above, parametric optimizer 220 could determine specific values of spring constants that optimally meet an objective function set forth in problem definition 122. In this manner, parametric optimizer 220 generates design options 124. Each design option 124 includes not only a particular arrangement of elements derived from the corresponding configuration option 212, but also concrete values for the design variables associated with each element of that configuration option. These design variables may also be referred to herein as design parameters or simply parameters.

As shown, parametric optimizer 220 includes a dynamics solver 222, a sensitivity analyzer 224, parametric explorer 226, and a convergence evaluator 228. For a given configuration option 212, dynamics solver 222 is configured to analyze a system of continuous equations governing the physical dynamics of elements included in the configuration option. Based on this analysis, dynamics solver 222 simulates the dynamics of the configuration option. In doing so, dynamics solver 222 discretizes the system of continuous equations into discrete time steps using a numerical time stepping technique. Dynamics solver 222 may implement any technically feasible approach to simulating the dynamics of a constrained multibody system over time. Dynamics solver 222 also implements the above techniques to discretize the objective function and, potentially, any constraint functions defined in problem definition 122.

Based on the discretized equations of motion generated via dynamics solver 222, sensitivity analyzer 224 then evaluates the sensitivity of the discretized objective and constraint functions to changes in the design variables associated with the configuration option 212. Sensitivity analyzer 224 performs this evaluation by computing the derivative of one or more state variables defined in the discretized equations of motion with respect to the design variables, taking into account the implicit dependency of state variables on the design variables. Sensitivity analyzer 224 may implement different approaches to computing this derivative depending on the complexity of the configuration option 212. Based on the derivative of the discretized equations of motion, parametric optimizer 220 determines a gradient of the discretized objective function within a parametric design space that includes the configuration option. The parametric designs space encompasses some or all possible combinations of values for the design variables associated with the configuration option. Those values may be discretized to limit the total number of possible designs. Based on the gradient, parametric explorer 226 traverses the parametric design space in a direction that decreases the objective function. Via this traversal, parametric explorer 226 updates the design variables associated with the configuration option, and, ultimately, may optimize the design variables and, thus, the configuration option.

Convergence evaluator 228 is configured to determine whether the above described optimization process has converged. When determining convergence, convergence evaluator 228 evaluates the degree to which the configuration option 212 minimizes the objective function. If the optimization process has not converged, then convergence evaluator 228 initiates one or more additional iterations. Otherwise, convergence evaluator 228 outputs the optimized configuration option as a design option 124. Parametric optimizer 220 may perform the above-described process for each configuration option 212 generated by design space explorer 210.

In short, design engine 120 implements a two-step process for generating design options 124. In the first step, configuration explorer 210 generates numerous feasible configuration options 216 that may or may not optimally address the design problem. In this first step, configuration explorer 210 explores a configuration design space associated with the design problem. Then, in the second step, parametric optimizer 220 optimizes each configuration option 212 relative to the design objectives to generate design options 124. In this second step, parametric optimizer 220 explores a separate parametric design space associated with each configuration option 212. Each design option 124 generated in this manner may optimally address the design problem. Parametric optimizer 220 is described in greater detail below in conjunction with FIG. 3.

Efficient Sensitivity Analysis

Figure 3:
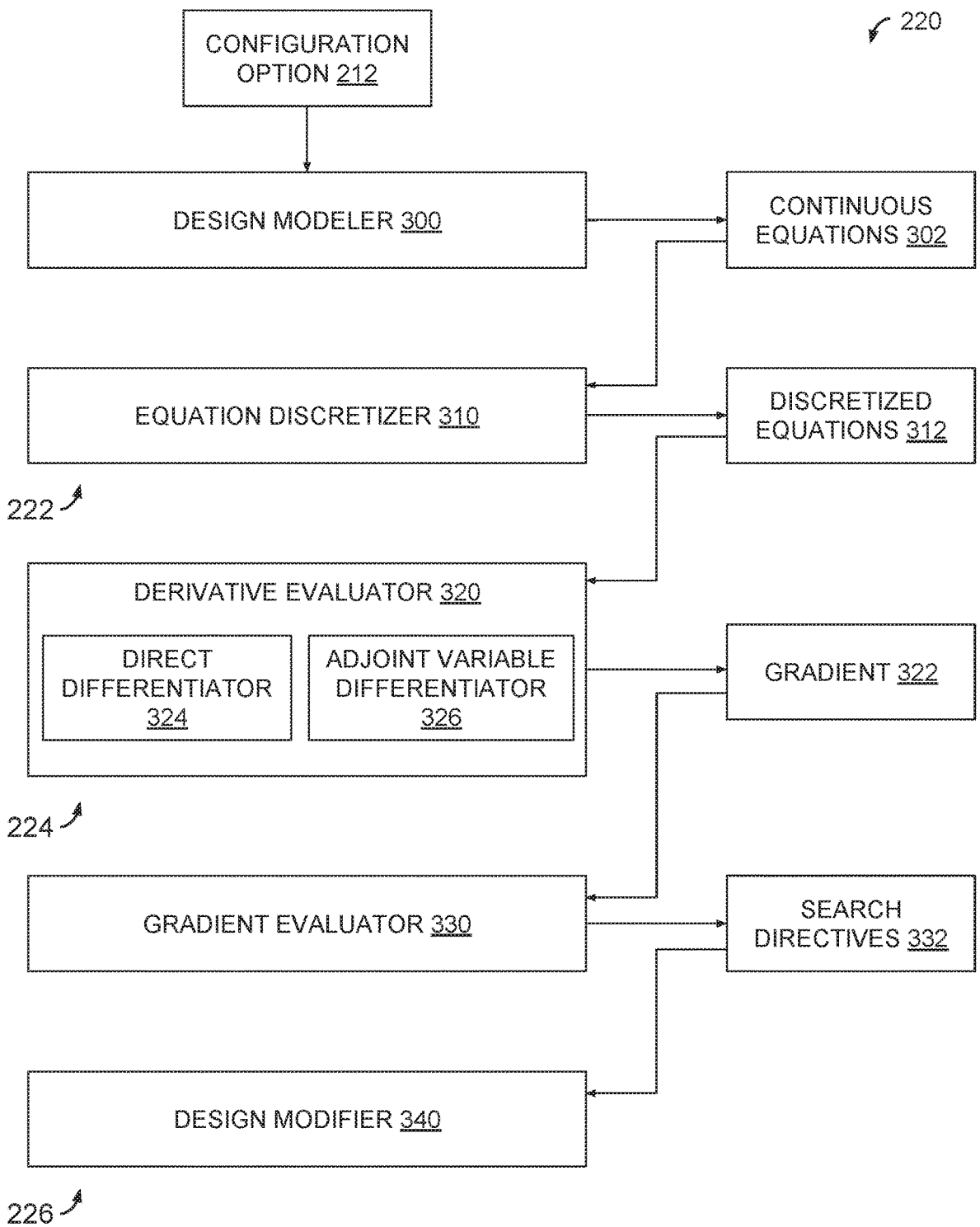
FIG. 3 is a more detailed illustration of the parametric optimizer of FIG. 2, according to various embodiments.

FIG. 3 is a more detailed illustration of the parametric optimizer of FIG. 2, according to various embodiments. As shown, parametric optimizer to 220 includes design modeler 300 and equation discretizer 310 within dynamics solver 222, derivative evaluator 320 within sensitivity analyzer 224, and gradient evaluator 330 and design modifier 340 within parametric explorer 226.

In operation, design modeler 300 processes a configuration option 212 to generate continuous equations 302. Continuous equations 302 include governing equations of motion that describe the dynamics of configuration option 212 in terms of the design variables associated with that configuration option. For example, a given continuous equation 302 could describe the time-varying vibrational characteristics of a flexible filament included in a configuration option 212 in terms of the cross-section of that element. A given continuous equation 302 could also describe time-varying forces applied to elements within a configuration option 212 which induce various dynamics including the flexure mentioned above. Continuous equations 302 may also include objective and/or constraint functions defined in problem definition 122. The objective function may indicate target characteristics for the design variables that relate to the continuous equations of motion. Returning to the above example, a given objective function could indicate that the cross-sectional area of the filament should be minimized, and a constraint function, for examples, could indicate that the time varying forces applied to that filament should be lower than a certain value. Equation discretizer 310 performs a discretization process with continuous equations 302 to generate discretized equations 312. Discretized equations 312 include discretized forms of the equations of motion and a discretized form of the objective and constraint functions. Equation discretizer 310 may implement geometric variational integrators or any other technically feasible numerical solver to solve the discretized motion equations.

Derivative evaluator 320 then determines the derivative of the discretized equations of motion and the derivative of the discretized objective and constraint functions with respect to the design variables. Derivative evaluator 320 may implement different techniques for computing the derivatives depending on the complexity and the size of design space of configuration option 212. With simple configuration options having few elements and/or few design variables, derivative evaluator 320 implements discrete direct differentiator 324 to directly differentiate the discretized equations of motion and to find the derivative of discrete state variables with respect to design variables. With more complex design problems, derivative evaluator 320 implements discrete adjoint variable differentiator 326 to compute the derivative using the so-called adjoint technique. Specifically, discrete adjoint variable differentiator 326 is configured to solve a set of adjoint equations associated with discretized equations 312 and then use the resultant adjoint variables to determine the derivative of the defined objective and constraint functions.

Based on the computed discrete adjoint variables, derivative evaluator 320 then differentiates the discretized objective function with respect to the design variables to generate gradient 322. Gradient 322 indicates the curvature of the parametric design space where configuration option 212 resides. Accordingly, gradient 322 may indicate regions of the parametric design space with increasing values for the objective function and other regions of the parametric design space with decreasing values for the objective function.

Gradient evaluator 330 analyzes gradient 322 and generates search directives 332. Search directives 332 indicate how the parametric design space should be traversed in order to further minimize the objective function. For example, search directives 332 could include a vector having a specific magnitude and direction within the parametric design space and terminating at a specific position within the parametric design space associated with a reduced value for the objective function.

Designed modifier 340 traverses the parametric design space based search directives 332. In doing so, design modifier 340 computes updated values of the design variables, potentially reducing the objective function. This process may repeat iteratively until one or more convergence criteria are met. A convergence criterion could indicate, for example, that optimization has converged when the objective function reaches a specific value. Upon convergence, parametric optimizer 220 outputs a design option 124, which includes optimal parametric values for the design variables. Again, those design variables could include any form of physical parameters, including individual values, collections of values describing geometry, position data, material properties, and so forth. Although the above techniques are described relative to one objective function, person skilled in the art will understand how those techniques can be applied to multiple objective functions and to multiple constraint functions, as well.

Because parametric optimizer 220 does not oversimplify configuration options during optimization, the evaluation of the objective function may be much more accurate compared to prior art approaches. In addition, because parametric optimizer 220 computes the gradient of the parametric design space, that design space can be explored in a much more efficient manner compared to prior art techniques. Finally, implementing discretized equations in the manner described produces more computationally stable results that are easier to solve compared to corresponding continuous equations.

Figure 4:
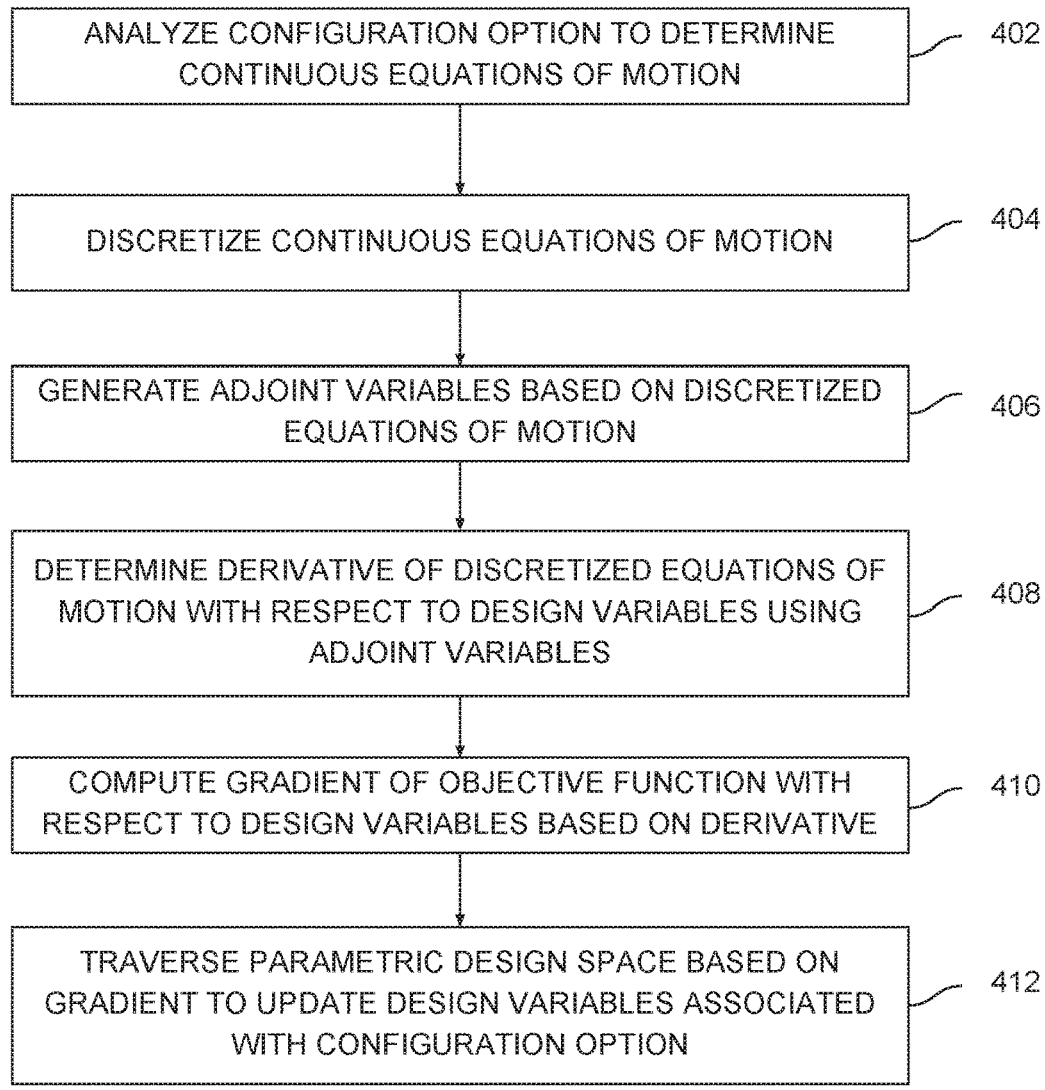
FIG. 4 is flow diagram of method steps for performing a sensitivity analysis when traversing a design space, according to various embodiments.

FIG. 4 is flow diagram of method steps for determining an optimal set of parameters for a mechanical assembly design, according to various embodiments. Although the method steps are described in conjunction with the systems of FIGS. 1-6, persons skilled in the art will understand that any system may be configured to perform the method steps in any order.

As shown in the method 400 begins at step 402, where parametric optimizer 220 analyzes a configuration option to determine a set of continuous equations of motion. The configuration option describes an assembly of mechanical elements and an associated set of default design variables corresponding to each element. The continuous equations of motion govern the physical dynamics of the design. At step 404, parametric optimizer 220 discretizes the continuous equations of motion and then uses a numerical technique, for example geometric variational integrators, to solve these discretized dynamic equations. Parametric optimizer 220 may also discretize one or more objective functions and/or one or more constraints functions at step 404. At step 406, parametric optimizer 220 generates a set of adjoint variables using the discretized equations of motion and discretized objective and constraint functions. Parametric optimizer 220 may generate a different set of adjoint variables for each different objective and/or constraint function.

At step 408, parametric optimizer 220 determines, based on the adjoint variables determined at step 406, the derivative of the discretized equations of motion generated at step 404 relative to the design variables associated with the configuration option. Parametric optimizer 220 may also determine at step 408 that the initial configuration is sufficiently simple that this derivative may be directly computed. At step 410, parametric optimizer 220 determines the gradient of the objective function (typically in discretized form) based on the derivative of the discretized equations of motion the values obtained at step 408. The gradient determined at step 410 indicates the sensitivity of the objective and constraint functions to changes in the design variables and is evaluated considering the dependency of the objective and constraint functions on time. At step 412, parametric optimizer 220 traverses the parametric design space where the configuration option resides based on the gradient to update the design variables associated with configuration option. Parametric optimizer 220 may repeat the method 400 to iteratively update the configuration option until at least one convergence criterion is met. In doing so, parametric optimizer 220 may implement certain steps of the method 400 for each time step generated via the discretization process.

In sum, a design engine generates a configuration option that includes a specific arrangement of interconnected mechanical elements adhering to one or more design constraints. Each element within a given configuration option is defined by a set of design variables. The design engine implements a parametric optimizer to optimize the set of design variables associated with each configuration option. For a given configuration option, the parametric optimizer discretizes continuous equations governing the physical dynamics of the configuration. The parametric optimizer then determines the gradient of objective or constraint functions based on the discretized equations. Then, the parametric optimizer traverses a design space where the configuration option resides to reduce the objective function, thereby optimizing the design variables.

At least one advantage of this technique is that configuration options are not oversimplified in order to evaluate the objective function. Accordingly, the degree to which a given configuration option meets the objective function can be more accurately determined compared to conventional techniques and convergence can therefore be more precisely identified. In addition, because the parametric optimizer computes the gradient of the objective function, the design space associated with the design problem can be explored in a more directed manner compared to conventional techniques that do not compute gradients. Finally, implementing discretized equations in the manner described produces more computationally stable results that are easier to solve compared to corresponding continuous equations. For at least these reasons, the disclosed approach represents a technical advancement over conventional optimization algorithms that are less accurate and less efficient.

1. Some embodiments include a computer-implemented method for generating design options for mechanical assemblies, the method comprising: generating a first configuration for a mechanical assembly, wherein the first configuration includes a set of design variables associated with a plurality of interconnected elements, generating a first discretized equation based on at least one continuous equation of motion, wherein the first discretized equation indicates time-varying dynamics of the first configuration across a sequence of time steps, generating a second discretized equation based on the first discretized equation and a first objective function, and computing a modified set of design variables based on the second discretized equation and the set of design variables to generate a second configuration for the mechanical assembly, wherein the modified set of design variables minimizes the first objective function.

2. The computer-implemented method of clause 1, wherein generating the first discretized equation comprises performing a forward simulation of the at least one continuous equation of motion.

3. The computer-implemented method of any of clauses 1 and 2, wherein generating the second discretized equation comprises: differentiating the first discretized equation to generate a first derivative, generating a discretized form of the first objective function, differentiating the discretized form of the first objective function to generate a second derivative, and replacing a first portion of the second derivative with the first derivative.

4. The computer-implemented method of any of clauses 1, 2, and 3, wherein differentiating the first discretized equation comprises solving at least one adjoint equation to generate at least one adjoint value, wherein the first derivative is generated based on the at least one adjoint value.

5. The computer-implemented method of any of clauses 1, 2, 3, and 4 wherein generating the discretized form of the first objective function comprises performing a forward simulation of the first objective function.

6. The computer-implemented method of any of clauses 1, 2, 3, 4, and 5, wherein the time-varying dynamics of the first configuration include a time-varying flexure of a first element included in the first configuration during the sequence of time steps.

7. The computer-implemented method of any of clauses 1, 2, 3, 4, 5, and 6, wherein the time-varying dynamics of the first configuration include a time-varying force applied to a first element included in the first configuration across the sequence of time steps.

8. The computer-implemented method of any of clauses 1, 2, 3, 4, 5, 6, and 7, wherein the second discretized equation comprises a gradient of the first objective function relative to the design variables, and wherein computing the modified set of design variables comprises traversing a parametric design space based on the gradient.

9. The computer-implemented method of any of clauses 1, 2, 3, 4, 5, 6, 7, and 8, wherein the first configuration resides at a first position within the parametric design space and is associated with a first value of the first objective function, the second configuration resides at a second position within the parametric design space and is associated with a second value of the first objective function, and wherein the first value exceeds the second value.

10. The computer-implemented method of any of clauses 1, 2, 3, 4, 5, 6, 7, 8, and 9, wherein generating the first configuration for the mechanical assembly comprises traversing a configuration design space to identify a plurality of different configurations that do not violate a same set of constraints, and wherein the plurality of different configurations includes the first configuration.

11. Some embodiments include a non-transitory computer-readable medium storing program instructions that, when executed by a processor, cause the processor to generate design options for mechanical assemblies by performing the steps of: generating a first configuration for a mechanical assembly, wherein the first configuration includes a set of design variables associated with a plurality of interconnected elements, generating a first discretized equation based on at least one continuous equation of motion, wherein the first discretized equation indicates time-varying dynamics of the first configuration across a sequence of time steps, generating a second discretized equation based on the first discretized equation and a first objective function, and computing a modified set of design variables based on the second discretized equation and the set of design variables to generate a second configuration for the mechanical assembly, wherein the modified set of design variables minimizes the first objective function.

12. The non-transitory computer-readable medium of clause 11, wherein the step of generating the first discretized equation comprises performing a forward simulation of the at least one continuous equation of motion.

13. The non-transitory computer-readable medium of any of clauses 11 and 12, wherein the step of generating the second discretized equation comprises: differentiating the first discretized equation to generate a first derivative, generating a discretized form of the first objective function, differentiating the discretized form of the first objective function to generate a second derivative, and replacing a first portion of the second derivative with the first derivative.

14. The non-transitory computer-readable medium of any of clauses 11, 12, and 13, wherein differentiating the first discretized equation comprises solving at least one adjoint equation to generate at least one adjoint value, wherein the first derivative is generated based on the at least one adjoint value.

15. The non-transitory computer-readable medium of any of clauses 11, 12, 13, and 14, wherein generating the discretized form of the first objective function comprises performing a forward simulation of the first objective function.

16. The non-transitory computer-readable medium of any of clauses 11, 12, 13, 14, and 15, wherein the time-varying dynamics of the first configuration include a time-varying flexure of a first element included in the first configuration in response to a time-varying force applied to the first element during the sequence of time steps.

17. The non-transitory computer-readable medium of any of clauses 11, 12, 13, 14, 15, and 16, wherein the second discretized equation comprises a gradient of the first objective function relative to the design variables, and wherein computing the modified set of design variables comprises traversing a parametric design space based on the gradient.

18. The non-transitory computer-readable medium of any of clauses 11, 12, 13, 14, 15, 16, and 17, wherein traversing the parametric design space comprises minimizing the first objective function at a first location within the parametric design space.

19. The non-transitory computer-readable medium of any of clauses 11, 12, 13, 14, 15, 16, 17, and 18, wherein generating the first configuration for the mechanical assembly comprises exploring a configuration design space to eliminate a plurality of different configurations that violate at least one constraint included in a set of constraints, and wherein the plurality of different configurations excludes the first configuration.

20. Some embodiments include a system for generating design options for mechanical assemblies, comprising: a memory restoring a design engine, and a processor that, when executing the design engine, is configured to perform the steps of: generating a first configuration for a mechanical assembly, wherein the first configuration includes a set of design variables associated with a plurality of interconnected elements, generating a first discretized equation based on at least one continuous equation of motion, wherein the first discretized equation indicates time-varying dynamics of the first configuration across a sequence of time steps, generating a second discretized equation based on the first discretized equation and a first objective function, and computing a modified set of design variables based on the second discretized equation and the set of design variables to generate a second configuration for the mechanical assembly, wherein the modified set of design variables minimizes the first objective function.

Any and all combinations of any of the claim elements recited in any of the claims and/or any elements described in this application, in any fashion, fall within the contemplated scope of the present invention and protection The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating design options for mechanical assemblies, the method comprising:
    generating a first configuration for a mechanical assembly, wherein the first configuration includes a set of design variables associated with a plurality of interconnected elements of the mechanical assembly;
    generating a first discretized equation of motion based on at least one continuous equation of motion, wherein the first discretized equation of motion indicates time-varying dynamics of the first configuration across a sequence of time steps;
    computing a derivative of the first discretized equation of motion by implementing either a first technique comprising differentiating a set of discrete state variables with respect to the set of design variables, or a second technique comprising solving at least one adjoint equation to generate at least one adjoint variable, wherein implementing either the first technique or the second technique is determined based on at least one of a number of design variables in the set of design variables or a number of interconnect elements in the plurality of interconnected elements of the mechanical assembly;
    computing a gradient of an objective function based on the derivative of the first discretized equation of motion; and
    computing a modified set of design variables associated with a second configuration for the mechanical assembly by traversing a parametric design space based on the gradient until reaching a minimum or maximum value of the objective function, wherein second configuration is associated with the minimum or maximum value of the objective function.

2. The computer-implemented method of claim 1, wherein generating the first discretized equation of motion comprises performing a forward simulation of the at least one continuous equation of motion.

3. The computer-implemented method of claim 1, further comprising:
    generating a discretized form of the objective function.

4. The computer-implemented method of claim 3, wherein generating the discretized form of the objective function comprises performing a forward simulation of the objective function.

5. The computer-implemented method of claim 1, wherein the time-varying dynamics of the first configuration include a time-varying flexure of a first element included in the first configuration during the sequence of time steps.

6. The computer-implemented method of claim 1, wherein the time-varying dynamics of the first configuration include a time-varying force applied to a first element included in the first configuration across the sequence of time steps.

7. The computer-implemented method of claim 1, wherein the first configuration resides at a first position within the parametric design space and is associated with a first value of the objective function, the second configuration resides at a second position within the parametric design space, and wherein the first value differs from the minimum or maximum value.

8. The computer-implemented method of claim 1, wherein generating the first configuration for the mechanical assembly comprises traversing a configuration design space to identify a plurality of different configurations that do not violate a same set of constraints, and wherein the plurality of different configurations includes the first configuration.

9. A non-transitory computer-readable medium storing program instructions that, when executed by a processor, cause the processor to generate design options for mechanical assemblies by performing the steps of:
  generating a first configuration for a mechanical assembly, wherein the first configuration includes a set of design variables associated with a plurality of interconnected elements of the mechanical assembly;
  generating a first discretized equation of motion based on at least one continuous equation of motion, wherein the first discretized equation of motion indicates time-varying dynamics of the first configuration across a sequence of time steps;
  computing a derivative of the first discretized equation of motion by implementing either a first technique comprising differentiating a set of discrete state variables with respect to the set of design variables, or a second technique comprising solving at least one adjoint equation to generate at least one adjoint variable, wherein implementing either the first technique or the second technique is determined based on at least one of a number of design variables in the set of design variables or a number of interconnect elements in the plurality of interconnected elements of the mechanical assembly;
  computing a gradient of an objective function based on the derivative of the first discretized equation of motion; and
  computing a modified set of design variables associated with a second configuration for the mechanical assembly by traversing a parametric design space based on the gradient until reaching a minimum or maximum value of the objective function, wherein the second configuration is associated with the minimum or maximum value of the objective function.

10. The non-transitory computer-readable medium of claim 9, wherein the step of generating the first discretized equation of motion comprises performing a forward simulation of the at least one continuous equation of motion.

11. The non-transitory computer-readable medium of claim 9, wherein the steps further comprise: generating a discretized form of the objective function.

12. The non-transitory computer-readable medium of claim 11, wherein generating the discretized form of the objective function comprises performing a forward simulation of the objective function.

13. The non-transitory computer-readable medium of claim 9, wherein the time-varying dynamics of the first configuration include a time-varying flexure of a first element included in the first configuration in response to a time-varying force applied to the first element during the sequence of time steps.

14. The non-transitory computer-readable medium of claim 9, wherein generating the first configuration for the mechanical assembly comprises exploring a configuration design space to eliminate a plurality of different configurations that violate at least one constraint included in a set of constraints, and wherein the plurality of different configurations excludes the first configuration.

15. A system for generating design options for mechanical assemblies, comprising:
  a memory storing a design engine; and
  a processor that, when executing the design engine, is configured to perform the steps of:
    generating a first configuration for a mechanical assembly, wherein the first configuration includes a set of design variables associated with a plurality of interconnected elements of the mechanical assembly,
    generating a first discretized equation of motion based on at least one continuous equation of motion, wherein the first discretized equation of motion indicates time-varying dynamics of the first configuration across a sequence of time steps,
    computing a derivative of the first discretized equation of motion by implementing either a first technique comprising differentiating a set of discrete state variables with respect to the set of design variables, or a second technique comprising solving at least one adjoint equation to generate at least one adjoint variable, wherein implementing either the first technique or the second technique is determined based on at least one of a number of design variables in the set of design variables or a number of interconnect elements in the plurality of interconnected elements of the mechanical assembly,
    computing a gradient of an objective function based on the derivative of the first discretized equation of motion, and
    computing a modified set of design variables associated with a second configuration for the mechanical assembly by traversing a parametric design space based on the gradient until reaching a minimum or maximum value of the objective function, wherein the second configuration is associated with the minimum or maximum value of the objective function.

16. The computer-implemented method of claim 1, wherein the set of design variables includes at least one of a geometric parameter or a positional parameter.

* * * * *